United States Patent Office 3,479,353
Patented Nov. 18, 1969

3,479,353
PREPARATION OF 6-AMINO-2,4-BIS(DIMETHYL-AMINO)-s-TRIAZINE
Max L. Petzold and Thomas W. Brooks, Gainesville, Fla., and John M. Bane, Jr., Parchment, Mich., assignors, by mesne assignments, to Calgon Corporation, a corporation of Delaware
No Drawing. Filed Dec. 26, 1967, Ser. No. 693,142
Int. Cl. C07d 55/24; A01n 9/22
U.S. Cl. 260—249.6                        6 Claims

ABSTRACT OF THE DISCLOSURE

The title compound, which is known to be useful as a fly sterilant, is made by reacting four moles of dimethylamine with cyanuric chloride in a medium of chloroform, to yield a high-purity reaction product of 2,4-bis(dimethylamino)-6-chloro-s-triazine which, without further purification, is reacted preferably in a dimethyl sulfoxide solution with ammonia.

BACKGROUND OF THE INVENTION

The compound 6-amino-2,4-bis(dimethylamino)-s-triazine is known to be useful as a sterilizing agent for house flies. See Example 7 of U.S. Patent 3,189,521 and compound No. 40 of Table I, p. 458, of Borkovec et al. J. Med. Chem. 10, 457 (May 1967). The compound is also referred to as $N^2,N^2,N^4,N^4$-tetramethylmelamine. In the past, the intermediate 2,4-bis(dimethylamino)-6-chloro-s-triazine has been prepared in the prior art by reacting cyanuric chloride in suspension or in a suitable organic solvent with dimethylamine in a molar ratio of cyanuric chloride/dimethyl amine of about 1:4.2 and, subsequently, purifying the product by distillation or crystallization. Pearlman and Banks teach that all three chlorine atoms of cyanuric chloride are replaced by dimethylamine at 25° C. See W. M. Pearlman and C. K. Banks, J. Am. Chem. Soc. 70, 3726 (1948). The second step of the synthesis is conventionally conducted in pressure equipment with a solvent such as dimethylsulfoxide at operating pressures in the range of 50 to 250 p.s.i.g. See Borkovec et al. J. Medicinal Chem., 10, 457 (1967). See also U.S. Patents 2,222,350 and 2,228,161.

The processes of the prior art result in substantial quantities of the mono- and trisubstituted products. Pearlman and Banks teach that, in reacting cyanuric chloride with dimethyl amine, all three chlorines are replaced at 25° C. See W. M. Pearlman and C. K. Banks, J. Am. Chem. Soc. 70, 3726 (1948). Moreover, in the conversion of 2,4-bis (dimethylamino)-6-chloro-s-triazine to 2-amino-4,6-bis (dimethylamino)-s-triazine, the use of the pressure has been required (see Example II of the present application, and Borkovec et al., J. Medicinal Chem. 10, 457 (1967).

While the prior art has used about 4.2 moles of dimethyl amine to one mole of cyanuric chloride, we are able to use 4.0 moles to achieve an excellent yield of the desired reaction product by performing the reaction in chloroform.

The chemistry of the reaction may be illustrated as follows:

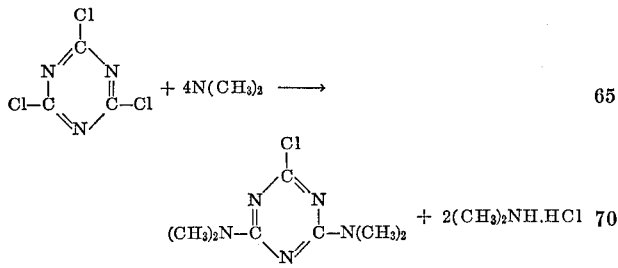

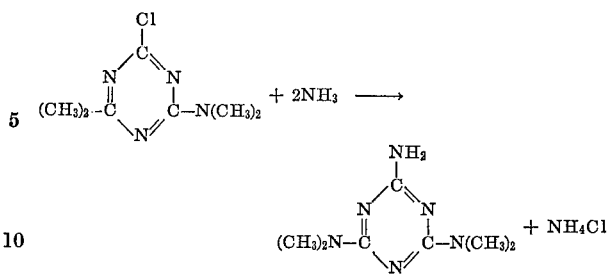

SUMMARY OF THE INVENTION

We have found that cyanuric chloride dissolved in chloroform will react with four moles of dimethylamine at temperatures of 5–20° C. to give, 2,4-bis(dimethylamino)-6-chloro-s-triazine in good yield and essentially free of the corresponding monosubstituted and trisubstituted products, 2-(dimethylamino)-4,6-dichloro-s-triazine and hexamethylmelamine. After washing the reaction mixture free of $CH_3NH.HCl$ with water, evaporation of the reaction solvent leaves the desired intermediate chloro-s-triazine as a white crystalline material which is sufficiently pure to be used in the subsequent step without having to be distilled or recrystallized.

We also find that the second step, treatment of 2,4-bis (dimethylamino)-6-chloro-s-triazine with ammonia gas to give 2-amino-4,6-bis(dimethylamino)-s-triazine, may be carried out at atmospheric pressure simply by passing ammonia into a dimethylsulfoxide solution of the chloro-s-triazine at a temperature of 70° to 185° C., preferably 120–140° C. This procedure circumvents the requirement for high pressure equipment. Instead of dimethyl sulfoxide, we may use any other high boiling (that is, having a boiling point higher than about 130° C.) polar aprotic solvent. Examples of suitable solvents are dimethyl formamide, dimethyl acetamide, N-methyl pyrrolidone, and tetramethyl sulfone. Our preferred temperature for the second reaction is about 130° C.

By virtue of these modifications, the overall process for manufacturing 6-amino-2,4-bis(dimethylamino)-s-triazine is considerably simplified and rendered amenable to commercial scales of operation.

Illustrative of our invention are the following examples:

Example I.—Preparation of 2,4-bis(dimethylamino)-6-chloro-s-triazine

A 100-gal. stainless steel jacketed kettle was charged with 150 lbs. of cyanuric chloride and 55 gals. of technical grade chloroform. The kettle was closed and sealed and its contents cooled to 5° C. While holding the temperature of the stirred reaction mixture in the range of 5–20° C., 140 lbs. of dimethylamine was added as a liquid at a pressure of 2–3 p.s.i.g. Addition of all of the dimethylamine requires 12–14 hours. The reaction mixture was then washed three times with 25 gal. portions of water to remove the dimethylamine hydrochloride by-product. The organic phase was then dried over 30 lbs. of anhydrous magnesium sulfate and filtered. The filtrate was returned to the kettle and strip distilled to a pot temperature of 110° C. under a water aspirator. Upon cooling the residue crystallized and was shown by gas-liquid chromoatographic analysis to be better than 95% pure 2,4-bis(dimethylamino)-6-chloro-s-triazine. The yield was 155 lbs. or 94.3% of theory. The identity of the product was established from its gas-liquid chromatographic retention time and infrared spectrum by comparison with an authentic sample.

Example II.—Preparation of 2-amino-4,6-bis(dimethylamino)-s-triazine by the high pressure, prior art method A 10-gal. autoclave equipped for agitation by means of a dasher and fitted with a rupture disc rated for 600 p.s.i. at 72° C. was charged with 13.2 lbs. of 2,4-bis(dimethylamino)-6-chloro-s-triazine and 5 gal. of dimethylsulfoxide. The autoclave was then sealed and 3.45 lbs. of ammonia was added under pressure. The contents were then heated gradually until the internal temperature of the apparatus was 130° C. An exotherm was noted during the reaction which caused the reaction mixture to reach a temperature of 165° and a pressure of 155 p.s.i.g. After four hours the exotherm had subsided and the pressure had dropped to 45 p.s.i. where it held constant at a temperature of 130° C. The autoclave contents weer then cooled and removed, the crude product being collected as a solution in dimethylsulfoxide.

Repetitions of this experiment are tabulated below:

| Exp. No. | Reactor Charge | | | Observations |
| --- | --- | --- | --- | --- |
| | Triazine | Ammonia | DMSO | |
| 2 | 13.2 pounds | 3.45 pounds | 5 gallons | Max. pressure 155 p.s.i.g., max. temp. 165° C. |
| 3 | do | do | do | Do. |
| 4 | do | do | do | Violent exotherm, reactor damaged, charge lost. |
| 5 | 6.6 pounds | 1.7 pounds | 2.5 gallons | Max. pressure 120 p.s.i.g., max. temp. 138° C. |
| 6 | 26.4 pounds | 6.8 pounds | 5 gallons | Exotherm, disc. blew at 440 p.s.i.g. and 185° C., half of charge lost. |

The dimethylsulfoxide solutions of crude product from all six runs were combined and poured into 20 gal. of water. The solids which precipitated were collected by filtration and air-dried. The crude solid product was then recrystallized from chloroform (2.2 lbs./12 l. CHCl$_3$). After collecting the first crop of recrystallized product a second crop was collected by evaporating the mother liquors to one-third their volume and collecting by filtration. The combined crops amounted to 28.8 lbs. or 48.5% of theoretical after allowing for materials lost in the blow offs. The purified product melted at 223–225° and was spectroscopically identical to authentic 2-amino-4,6-bis(dimethylamino)-s-triazine.

Example III.—Preparation of 2-amino-4,6-bis(dimethylamino)-s-triazine at atmospheric pressure Into a 50-liter Pyrex glass three-neck flask fitted with mechanical stirrer, thermometer, and gas inlet tube extending below the liquid surface was charged 13.2 lbs. of 2,4-bis(dimethylamino)-6-chloro-s-triazine dissolved in 5 gal. of dimethylsulfoxide. The stirred solution was heated at 135–140° C. and anhydrous ammonia gas was passed in through the gas inlet tube until gas absorption ceased. The time elapsed when gas absorption ceased was 8–10 hours. The reaction solution was then cooled and poured into 5 gal. of water and the precipitated crude product was collected by filtration. After air-drying the crude product collected from five such runs, they were combined and treated with 3 N aqueous hydrochloric acid (1.75 liters/ 2.2 lbs. of solid). The resulting slurry was filtered and the filtrate was treated with 50% aqueous sodium hydroxide solution until basic. The solids precipitated by addition of aqueous base were collected as Crop I.

A second crop of purified product was obtained by treating the original filtration residue with 3 N aqueous hydrochloric acid at 50–55°, cooling to 10° C. and filtering. The filtrate affords Crop II upon basifying with 50% aqueous sodium hydroxide and collecting by filtration.

Crops I and II were combined to give 25.8 lbs. (53.9% of theory) of 2-amino-4,6-bis(dimethylamino)-s-triazine.

Our invention may thus be stated to be a process of making the title compound comprising (1) reacting, in a chloroform medium four moles of dimethyl amine with one mole of cyanuric chloride to obtain about one mole of 2,4-bis(dimethylamino)-6-chloro-s-triazine, and (2) reacting the reaction product thereof with ammonia gas to atmospheric pressure, and a temperature between 70° and 185° C. Our invention includes a method of making 6-amino-2,4-bis(dimethylamino)-s-triazine by reaction (2).

We claim:
1. Method of making 6-amino-2,4-bis(dimethylamino)-s-triazine comprising (1) reacting, in a chloroform medium, four moles of dimethyl amine with one mole of cyanuric chloride to obtain about one mole of 2,4-bis(dimethylamino)-6-chloro-s-triazine, and (2) reacting the reaction product thereof in a medium of high boiling polar aprotic solvent with ammonia gas at atmospheric pressure, and a temperature between 70° and 185° C.

2. Method of claim 1 in which the temperature for the first reaction is 5–20° C.

3. Method of claim 1 in which the temperature for the second reaction is 120–140° C.

4. Method of claim 1 in which the solvent medium for the second reaction is dimethyl sulfoxide.

5. Method of making 6-amino-2,4-bis(dimethylamino)-s-triazine comprising reacting 2,4-bis(dimethylamino)-6-chloro-s-triazine with ammonia in a medium of dimethylsulfoxide at a temperature between 70° and 185° C. and at atmospheric pressure.

6. Method of claim 5 in which the temperature is held between 120° C. and 140° C.

References Cited

UNITED STATES PATENTS

| 2,222,350 | 11/1940 | Keller et al. | 260—249.6 |
| 2,228,161 | 1/1941 | Zerweck et al. | 260—249.6 |
| 2,909,421 | 10/1959 | Gysin et al. | 260—249.6 XR |
| 3,156,690 | 11/1964 | Dexter et al. | 260—249.6 XR |

OTHER REFERENCES

Borkovec et al., J. Medicinal & Pharm. Chem., vol. 10, pp. 457–61 (1967).

Pearlman et al., J. Am. Chem. Soc., vol. 70, pp. 3726–8 (1948).

HENRY R. JILES, Primary Examiner

JOHN M. FORD, Assistant Examiner

U.S. Cl. X.R.

260—249.8